Figure 1:
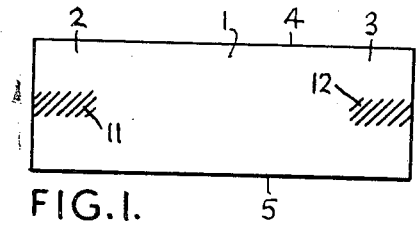

Jan. 22, 1957　　　　G. TAUNTON　　　　2,778,173
METHOD OF PRODUCING AIRTIGHT PACKAGES
Filed Aug. 24, 1951　　　　　　　　　　　　　2 Sheets-Sheet 1

Jan. 22, 1957 G. TAUNTON 2,778,173
METHOD OF PRODUCING AIRTIGHT PACKAGES
Filed Aug. 24, 1951 2 Sheets-Sheet 2

Inventor:
Gerald Taunton

United States Patent Office 2,778,173
Patented Jan. 22, 1957

2,778,173
METHOD OF PRODUCING AIRTIGHT PACKAGES

Gerald Taunton, Wells, England, assignor to Wilts United Dairies Limited, Trowbridge, England, a British company Application August 24, 1951, Serial No. 243,515

Claims priority, application Great Britain November 29, 1950

5 Claims. (Cl. 53—22)

This invention relates to the production of airtight packages and in particular to means for facilitating the evacuation of the same.

It has already been proposed to pack cheese and other commodities in flexible oxygen-proof containers from which part or all of the air has been removed.

For example in the specification of application No. 173,071, now Patent Number 2,649,234, there is described a method for reducing the oxygen content of a flexible airtight sealed package, for example a bag or pouch, which comprises the steps of bringing the material of the package, at a part thereof where the inner faces of the material can be brought together without obstruction, into contact with a suction member having an orifice therein, applying suction to said orifice, piercing an exhausting hole in the material through said orifice so that air is withdrawn from the interior of the package, bringing the inner faces of the packaging material into contact with each other in the neighbourhood of said orifice and sealing said faces together so that an airtight seal is effected between the interior of the package and said exhausting hole. It is also possible to use a package in which the exhausting hole has been provided prior to the location of the same adjacent the orifice. Thus a modified method according to the said specification comprises the steps of providing an exhausting hole in the material of the package at a part thereof where the inner faces of the packaging material can be brought together without obstruction, bringing said material into contact with a suction member having an orifice therein so that said exhausting hole communicates with said orifice, applying suction to said orifice so that air is withdrawn from the interior of the package, bringing the inner faces of the packaging material into contact in the neighbourhood of said orifice and sealing said faces together so that an airtight seal is effected between the interior of the package and said exhausting hole. The material of the package may be any suitable oxygen-proof material. Examples of suitable material are waxed sheet material, suitably coated cellulose acetate film, suitably coated regenerated cellulose film, the material known under the registered trademark "Pliofilm," metal foil, and laminated materials, such as "Pliofilm"-cellulose acetate, "Pliofilm"-regenerated cellulose, polyethylene-cellulose acetate, polyethylene-regenerated cellulose, or "Pliofilm"-metal foil. It is preferred to use a material the inner faces of which can be sealed together by the application of heat and pressure in known manner.

With some packaging materials it has been found that there is a tendency for the inner faces of the material to adhere to each other during the process of evacuation, especially in the later stages of the latter and especially in the neighbourhood of the exhausting hole, and this may lead to defective evacuation or to a substantial slowing down of the evacuation process.

One of the objects of the present invention is to avoid the said objection.

According to the present invention a method of producing a flexible airtight sealed package of oxygen-proof packaging material by the partial or complete evacuation of air from the package through an exhausting hole, includes the step of providing, prior to the evacuation process, projections within the package in the neighbourhood of the site for the exhausting hole (i. e. the point at which the exhausting hole is to be made or has been made).

The said projections may be provided on the film or foil (hereinafter referred to as "film") containing the site for the exhausting hole by pressing the film between complementary male and female dies or tools or between a male die and a resilient surface, or they may be similarly provided on the film which is to be brought into contact with said film containing the site for the exhausting hole, or the projections may be similarly provided on both films. The projections may also be formed by other methods. Alternatively, or additionally, a strip of material may be provided with projections and slipped into the package so that it occupies a position beneath the site for the exhausting hole. This strip, which may if required form part of an inner wrapping material, can be of oxygen-proof material which by heat and/or pressure can be made to adhere to the inner surface of the packaging material, so that an airtight seal is effected between the interior of the package and the said hole.

The male and female dies or tools used for forming the projections may be heated, especially when the material to be impressed is thermoplastic. The heating softens the material so that the projections are more easily formed and retained. If the dies or tools are not heated, there is a possibility that the material may be damaged or that the impressed projections may at least partly flatten out when the dies or tools are removed, due to the natural resiliency of the material.

When a strip of material provided with projections is inserted beneath the film containing the site for the exhausting hole, the subsequent sealing may be carried out so that it seals the said strip to the said film or, if desired, so that it seals the strip to both of the films between which it is situated.

The projections may take any desired form. For example they may be in the form of a plurality of substantially hemispherical, conical or pyramidal protuberances, or of a plurality of ridges which may be in the form of parallel or radiating, straight, curved or zigzag lines.

The projections may be confined to a small area in the immediate neighbourhood of the site for the exhausting hole or they may extend over a wider area and may even extend over the entire area of one or both sides of the package. It is preferred that the area of the projections should at least extend from the vicinity of the site for the exhausting hole to the nearest part of the package occupied by the commodity.

When the commodity to be packed in the package is of a pulverulent or granular nature, the distance between adjacent projections is preferably such that while permitting free passage of the air being exhausted from the package, it prevents the passage of the commodity itself. In this way the projections form a kind of strainer or filter which prevents the commodity from being drawn into the immediate vicinity of the exhausting hole where it might give rise to a defective seal or clog the suction device or reduce the amount of commodity in the package.

The projections according to this invention provide a plurality of air passages leading to the exhausting hole so that the desired degree of evacuation is attained more rapidly than would otherwise be the case, and in the case of packaging materials which would tend to adhere together, the projections render possible an evacuation where it might otherwise have been difficult or impossible.

The invention will now be further described with reference to the accompanying drawings which are given by way of example.

Figure 2:
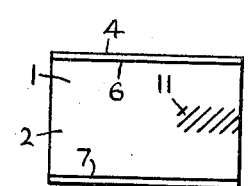
Figure 3:
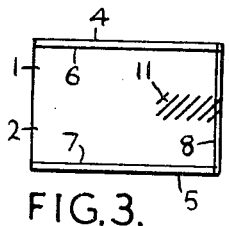
Figure 4:
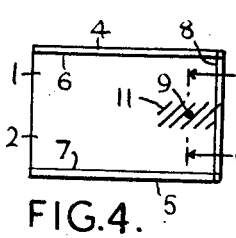
Figure 5:
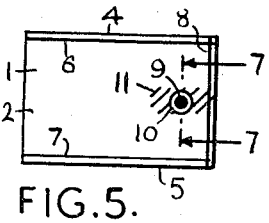
Figures 6A, 6B, 7:
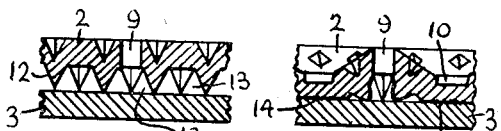
Figure 8:
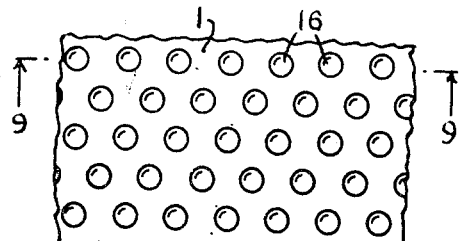
Figure 9A:
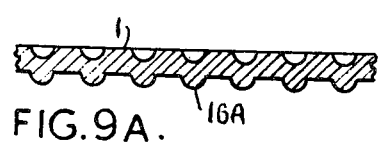
Figure 9B:
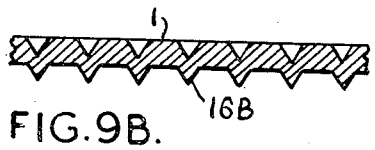
Figure 10:
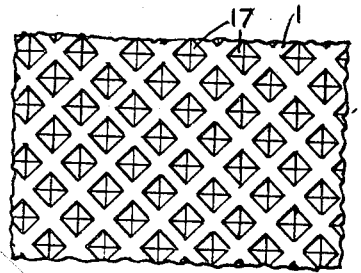
Figure 11:
Figure 12:
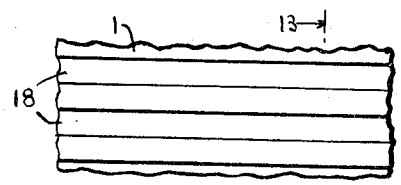
Figure 13:

In the drawings:

Figures 1 to 5 illustrate diagrammatically the steps in one method of forming an airtight sealed package, Figures 6A to 6E are enlarged sections on the line 6—6 of Figure 4 indicating various possible arrangements of the projections, Figure 7 is an enlarged section on the line 7—7 of Figure 5 showing the films of Figure 6A after sealing, Figure 8 is an enlarged plan view of a portion of film showing alternative forms of projections, Figures 9A and 9B are sections on the line 9—9 of Figure 8, Figure 10 is an enlarged plan view of a portion of film showing a further form of projections, Figure 11 is a section on the line 11—11 of Figure 10, Figure 12 is an enlarged plan view of a portion of film showing another form of projections, Figure 13 is a section on the line 13—13 of Figure 12, and Figures 14 to 19 illustrate diagrammatically parts of sealed packages showing various configurations of projections.

Referring first to Figures 1 to 5, Figure 1 represents a rectangular strip of airtight flexible oxygen-proof material in the form of a film 1. In Figure 2, the left-hand portion 2 of the film 1 of Figure 1 has been folded over the right-hand portion 3 and the edges 4, 5 sealed in any suitable way along lines 6, 7 to form a bag or pouch open at the right-hand end. In Figure 3 the pouch has been closed by sealing the open end thereof along line 8, after the desired commodity (not shown) has been inserted into the pouch. In Figure 4 the upper film 2 has been provided with an exhausting hole 9 through which air can be withdrawn from the pouch to any desired extent. In Figure 5 an annular seal 10 has been provided around the exhausting hole 9 to seal off the pouch from the atmosphere. All of these operations may be performed in the manner described in the specification above referred to. The exhausting hole may, of course, be provided in the film 1 at the stage represented by Figure 1, if desired.

According to the present invention, projections are provided in the vicinity of the site for the exhausting hole 9. These projections may be provided on the film 1 in the area indicated by shading 11, in the area indicated by shading 12, in both of the areas 11 and 12, or in a strip inserted beneath the shaded area 11 of Figure 2. The projections may also extend over a wider area of the film 1 or may even extend over the entire area of the film 1, although in the case of transparent film this may not be desirable since the projections may interfere to some extent with the transparency of the film and render the contents less readily visible through the film.

Referring to Figure 6A, the upper film 2 is shown provided with projections 12 which have been produced for example by pressing the film 2 between heated complementary male and female dies or tools. The lower film 3 is not provided with projections. It will be seen that passages 13 are formed between the projections 12 for the passage of air from the interior of the package to the exhausting hole 9.

Figure 7 shows the two films of Figure 6A sealed together by an annular seal 10. This sealing may conveniently be effected by means of a heated annular tool which flattens out the projections in the film 2 immediately beneath the heated tool and causes the two films 2 and 3 to be welded together as shown at 14.

In Figure 6B projections 12 are provided on the lower film 3, the upper film 2 being free from projections.

Figure 6C:
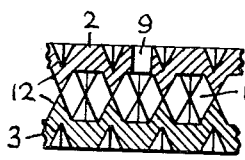

In Figure 6C, both of the films 2 and 3 are provided with projections 12.

Figure 6D:
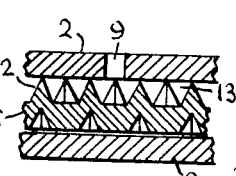

In Figure 6D, both of the films 2 and 3 are plain, and a strip 15 of suitable material is interposed between the two films 2 and 3 in the vicinity of the site of the exhausting hole 9, the said strip being provided with projections 12.

Figure 6E:
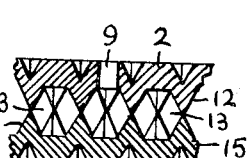

In Figure 6E the inserted strip 15, having projections 12, is interposed between an upper film 2 having projections 12 and a plain lower film 3.

The material of the inserted strip 15 in Figures 6D and 6E may be any material capable of being caused to adhere firmly in an airtight manner to the film 2 or to both of the films 2 and 3. It may be the same material as the films 2 and 3 or, in suitable cases, it may be a strip of paper, cardboard, metal foil or other material provided with projections.

Figure 8 is an enlarged plan view of a film 1 provided with hemispherical or conical depressions 16 in its upper surface which produce corresponding projections on the underside of the film which are hemispherical as shown at 16A in Figure 9A or conical as shown at 16B in Figure 9B.

In Figures 10 and 11, the projections 17 in the film 1 are pyramidal, while in Figures 12 and 13 the projections are in the form of ridges 18.

Figures 14 to 19 indicate various configurations of projections which may be provided on the upper film and/or on the lower film and/or on an inserted strip.

Figure 14:
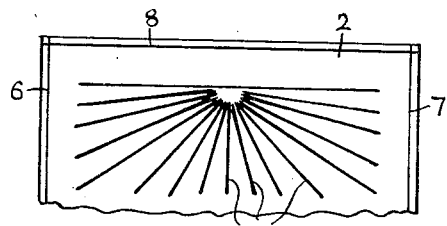
Figure 15:
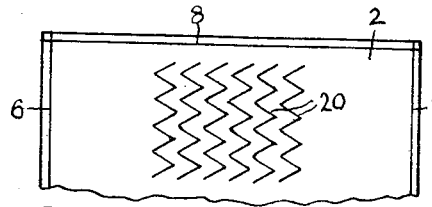
Figure 16:
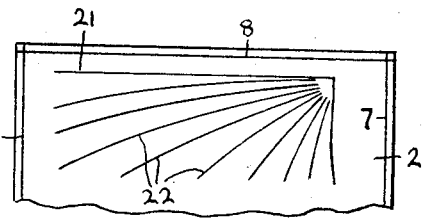
Figure 17:
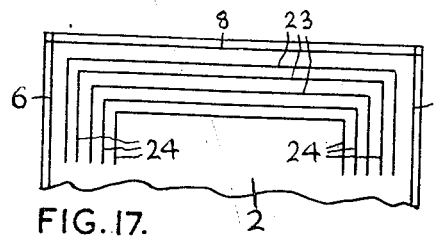
Figure 18:
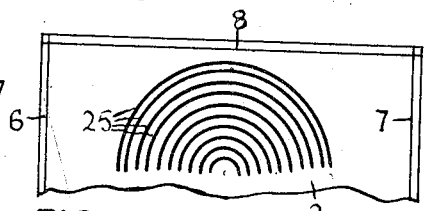
Figure 19:
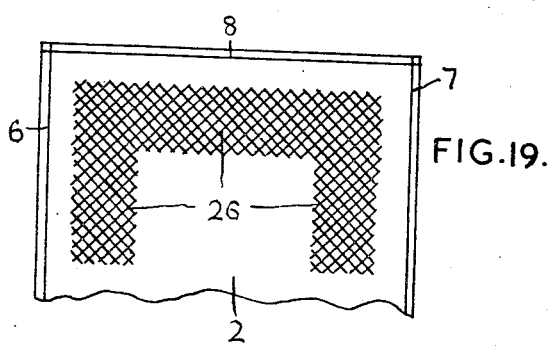

In Figure 14 the projections 19 are in the form of radiating ridges; in Figure 15 the projections take the form of zig-zag ridges 20; in Figure 16 the projections are ridges of which one is a straight line 21, the remainder being curved radiating lines 22; in Figure 17 the projections are constituted by ridges each of which consists of a straight portion 23 having at each end another straight portion 24 perpendicular thereto; in Figure 18 the projections are ridges arranged as concentric semicircles 25; and in Figure 19 the projections which may be of the kind illustrated in any of Figures 8 to 11, are provided to extend over the shaded area 26.

It will be understood that the projections, when they are to be provided in the material of the package itself, may be formed at any stage prior to the evacuation of the package. Thus they may be formed at the stage represented by Figure 1 or Figure 2, or at any earlier stage, for example during the manufacture of the film itself.

Reference is made to my copending application Serial No. 339,017 titled "Production of Air-Tight Packages" filed August 24, 1951, which describes a sealing method related to the one described herein.

I claim:

1. A fluid-tight packaging process comprising the steps of forming a closed package envelope consisting of a flexible fluid-tight sheet material having a first sheet portion formed with an evacuating opening, a second sheet portion overlying the first sheet portion, and having in at least one of said sheet portions at the face thereof directed toward the other sheet portion a plurality of spacing projections forming between said overlying sheet portions a passage communicating with said opening; removing fluid from the interior of the envelope through said evacuating opening and said passage formed by said projections between said sheet portions; and then sealing said opening.

2. A fluid-tight packaging process comprising the steps of forming a closed package envelope consisting of a flexible fluid-tight sheet material having a first sheet portion formed with an evacuating opening, a second sheet portion overlying the first sheet portion, and having in said first sheet portion at the face thereof directed toward said second sheet portion a plurality of spacing projections forming between said overlying sheet portions a passage communicating with said opening; removing fluid from the interior of the envelope through said evacuating opening and said passage formed by said projections between said sheet portions; and then sealing said opening.

3. A fluid-tight packaging process comprising the steps of forming a closed package envelope consisting of a flexible fluid-tight sheet material having a first sheet portion formed with an evacuating opening, a second sheet portion overlying the first sheet portion, and having in said second sheet portion at the face thereof directed toward said first sheet portion a plurality of spacing projections forming between said overlying sheet portions a passage communicating with said opening; removing fluid from the interior of the envelope through said evacuating opening and said passage formed by said projections between said sheet portions; and then sealing said opening.

4. A fluid-tight packaging process comprising the steps of forming a closed package envelope consisting of a flexible fluid-tight sheet material having a first sheet portion overlying the first sheet portion, and having in both of said sheet portions at the faces thereof directed toward each other, respectively, a plurality of spacing projections forming between said overlying sheet portions a passage communicating with said opening; removing fluid from the interior of the envelope through said evacuating opening and said passage formed by said projections between said sheet portions; and then sealing said opening.

5. A fluid-tight packaging process comprising the steps of forming projections in a blank of flexible, fluid-tight sheet material to provide a passage between said projections; folding one sheet portion of the blank over another sheet portion of the blank with said projections between said sheet portions and with the peripheral edges of said sheet portions contacting each other; sealing said contacting peripheral edges to each other for part of their length to form an envelope having an inlet at the unsealed part of said peripheral edges; introducing a commodity into said envelope through said inlet; sealing the remainder of said contacting peripheral edges to each other to close said inlet; piercing an evacuating opening in a part of said sheet material which communicates with said passage; removing fluid from the interior of said envelope through said passage and opening; and then sealing said opening.

References Cited in the file of this patent
UNITED STATES PATENTS

| | | |
|---|---|---|
| 1,938,593 | Jarrier | Dec. 12, 1933 |
| 2,105,376 | Scott | Jan. 11, 1928 |
| 2,292,295 | Royal | Aug. 4, 1942 |
| 2,387,812 | Sonneborn et al. | Oct. 30, 1945 |